(12) United States Patent
Shibata et al.

(10) Patent No.: US 9,667,537 B2
(45) Date of Patent: May 30, 2017

(54) TRANSPORT SYSTEM, PACKET TRANSPORT APPARATUS, AND PACKET TRANSPORT METHOD

(71) Applicant: Hitachi, Ltd., Tokyo (JP)

(72) Inventors: Takeshi Shibata, Tokyo (JP); Kiyotaka Takahashi, Tokyo (JP); Masahiro Kimura, Tokyo (JP)

(73) Assignee: HITACHI, LTD., Tokyo (JP)

(*) Notice: Subject to any disclaimer, the term of this patent is extended or adjusted under 35 U.S.C. 154(b) by 564 days.

(21) Appl. No.: 14/192,398

(22) Filed: Feb. 27, 2014

(65) Prior Publication Data

US 2014/0254600 A1 Sep. 11, 2014

(30) Foreign Application Priority Data

Mar. 11, 2013 (JP) ................................. 2013-048098

(51) Int. Cl.
*H04L 12/723* (2013.01)
*H04L 12/703* (2013.01)

(52) U.S. Cl.
CPC .............. *H04L 45/50* (2013.01); *H04L 45/28* (2013.01)

(58) Field of Classification Search
None
See application file for complete search history.

(56) References Cited

U.S. PATENT DOCUMENTS

| 2008/0069010 A1* | 3/2008 | Zhang | H04L 45/02 370/254 |
| 2012/0140679 A1* | 6/2012 | Inaba | H04L 12/437 370/258 |
| 2013/0022052 A1 | 1/2013 | Takase et al. | |

FOREIGN PATENT DOCUMENTS

JP 2013026829 2/2013

OTHER PUBLICATIONS

L. Andersson, et al., "IETF, Network Working Group, Request for Comments: 5036, Obsoletes: 3036, Category: Standards Track, LDP Specification", Oct. 2007.
M. Bocci, et al., "IETF, Request for Comments: 5921, Category: Informational, ISSN:2070-1721, A Framework for MPLS in Transport Networks", Jul. 2010.

* cited by examiner

*Primary Examiner* — Hassan Phillips
*Assistant Examiner* — Omeed D Rahgozar
(74) *Attorney, Agent, or Firm* — Volpe and Koenig, P.C.

(57) ABSTRACT

A transport system comprises a transport apparatus, which is used to construct a transport network using MPLS-TP; and a control apparatus for establishing a path in the transport network. The transport apparatus is coupled to a transfer apparatus, which is used to construct a transfer network using a network protocol different from an MPLS-TP protocol and uses the network protocol to establish a path in the transfer network in an autonomous distributed manner. The control apparatus and the transfer apparatus use the network protocol of the transfer network to transmit/receive, via the transport apparatus, control messages for controlling the transfer network. The transport apparatus avoids notifying the transfer apparatus of the fact that the control apparatus is not in a normal state, in a case where the path established in the transport network is determined as the normal state, even the control apparatus is determined as the abnormal state.

13 Claims, 11 Drawing Sheets

| MPLS INPUT LABEL | MPLS OUTPUT LABEL | OUTPUT INTERFACE | CORRESPONDING PATH | PATH STATE |
|---|---|---|---|---|
| 100 | 110 | IF1-1 | LSP1 | NORMAL |
| 200 | 210 | IF1-2 | LSP2 | NOT NORMAL |
|  |  |  |  |  |
|  |  |  |  |  |

| FACING ROUTER 501 | DESTINATION NETWORK 502 | NETMASK 503 | OUTPUT INTERFACE 504 | NEXT HOP 505 | NETWORK CONTROL APPARATUS 506 | CONTROL APPARATUS STATE 507 | CORRESPONDING PATH 508 | PATH STATE 509 |
|---|---|---|---|---|---|---|---|---|
| 10.0.0.1 | 0.0.0.0 | /0 | IF1-1 | 192.168.1.254 | OPS1 | NORMAL | LSP1 | NORMAL |
| 10.0.0.1 | 192.168.2.0 | /24 | IF1-2 | 192.168.2.254 | OPS1 | NORMAL | LSP2 | NOT NORMAL |
|  |  |  |  |  | OPS2 | NOT NORMAL | LSP3 | NORMAL |
|  |  |  |  |  |  |  |  |  |

TRANSPORT SYSTEM, PACKET TRANSPORT APPARATUS, AND PACKET TRANSPORT METHOD

CLAIM OF PRIORITY

The present application claims priority from Japanese patent application JP 2013-48098 filed on Mar. 11, 2013, the content of which is hereby incorporated by reference into this application.

BACKGROUND OF THE INVENTION

This invention relates to a transport system including transport apparatus, which is used to construct a transport network using MPLS-TP, and a control apparatus for controlling the transport apparatus.

Internet Protocol (IP) and Multiprotocol Label Switching (MPLS) are known as technologies for data communication between communication apparatus, which are used to construct an IT network.

IP is a technology that uses IP address for data communication between communication apparatus. Details of IP are defined in Internet Engineering Task Force (IETF) Request for Comments (RFC) 791 (see J. Postel, "IETF RFC 791 Internet Protocol", September 1981) and IETF RFC 2460 (see S. Deering, et al., "IETF RFC 2460 Internet Protocol, Version 6 (IPv6) Specification", December 1998).

MPLS is a technology that uses MPLS label for data communication between communication apparatus. Details of MPLS are defined in IETF RFC 3031 (see E. Rosen, et al., "IETF RFC 3031 Multiprotocol Label Switching Architecture", January 2001). In MPLS, a data communication route between communication apparatus is called a path, and IP is used to build a path in traditional MPLS. A communication apparatus that is the start point of a path and a communication apparatus that is the end point of the path are set by means of IP addresses. A route on the way to the path end point communication apparatus from the path start point communication apparatus is determined based on IP routing from the IP address of the start point communication apparatus to the IP address of the end point communication apparatus.

Path building in MPLS uses an IP layer protocol such as Label Distribution Protocol (LDP) defined in IETF RFC 5036 (see L. Andersson, et al., "IETF RFC 5036 LDP Specification", October 2007). A communication apparatus building a path between the start point communication apparatus of the path and the end point communication apparatus of the path executes data communication by IP.

In recent years, a work of defining a technology called MPLS Transport Profile (MPLS-TP) has been underway (see M. Bocci, et al., "IETF RFC 5921 A Framework for MPLS in Transport Networks", July 2010,). In MPLS-TP, a path is built not by IP but by settings set from a network control apparatus. A communication apparatus that is the start point of a path and a communication apparatus that is the end point of the path are set by specifying an interface and the like. A route on the way to the path end point communication apparatus from the path start point communication apparatus, too, is determined by specifying interfaces of the communication apparatus and the like.

SUMMARY OF THE INVENTION

When a communication network using traditional MPLS (IP/MPLS) and a communication network using MPLS-TP are connected, the difference in path building method between the two communication networks prevents proper building of a path that connects the IP/MPLS communication network and the MPLS-TP communication network. In order to build a proper path, a path for the IP/MPLS communication network needs to be built to path settings that are set by a network control apparatus in the MPLS-TP communication network, or an IP layer protocol with which a path is built in the IP/MPLS communication network needs to be in cooperation with the network control apparatus that builds a path for the MPLS-TP communication network.

A path for the IP/MPLS communication network is built by the processing of an IP layer protocol that is executed in the communication apparatus. The communication apparatus therefore treats an error of the IP layer protocol processing and that of path continuity alike. A path for the MPLS-TP communication network, on the other hand, is built by a network control apparatus which controls transport apparatus. A processing error of the network control apparatus and that of path continuity are therefore not treated alike.

However, when a path is built through cooperation between the IP layer protocol for building a path for the IP/MPLS communication network and the network control apparatus for building a path for the MPLS-TP communication network, an error of IP layer protocol processing in the network control apparatus which should not be treated as that of path continuity is treated as an error of path continuity in the IP/MPLS communication network where the MPLS-TP network is connected through the path.

An object of this invention is to provide a highly reliable communication system in which, even when a communication network using traditional MPLS and a communication network using MPLS-TP are connected through cooperation between an IP layer protocol and a network control apparatus, a processing error in the network control apparatus is not treated as an error of path continuity, and network control processing is separated from processing of data transmission along a path.

According to an aspect of the present invention, there is provided a transport system, comprising: a transport apparatus, which is used to construct a transport network using MPLS-TP; and a control apparatus for controlling the transport apparatus to establish a path in the transport network, wherein the transport apparatus is coupled to a transfer apparatus, which is used to construct a transfer network using a network protocol different from an MPLS-TP protocol and uses the network protocol to establish a path in the transfer network in an autonomous distributed manner, wherein the control apparatus and the transfer apparatus use the network protocol of the transfer network to transmit/receive, via the transport apparatus, control messages for controlling the transfer network, and wherein the transport apparatus is configured to: determine whether the control apparatus is a normal state or an abnormal state based on a reception condition of a control message transmitted from the control apparatus; determine whether the path established in the transport network is a normal state or an abnormal state; and avoid notifying the transfer apparatus of the fact that the control apparatus is the abnormal state, in a case where the path established in the transport network is determined as the normal state, even the control apparatus is determined as the abnormal state.

A brief description is now given of effects provided by the exemplary embodiment of this invention disclosed in this application. This invention enables to provide the highly reliable communication system in which, even when a communication network using traditional MPLS and a communication network using MPLS-TP are connected through cooperation between an IP layer protocol and a network control apparatus, a processing error in the network control apparatus is not treated as an error of path continuity, and network control processing is separated from processing of data transmission along a path.

Other objects, configurations, and effects than those described above are revealed in the following description of an embodiment.

BRIEF DESCRIPTION OF THE DRAWINGS

The present invention can be appreciated by the description which follows in conjunction with the following figures, wherein:

FIG. 5 is an explanatory diagram of an IP protocol management table which is kept by the packet transport apparatus according to the embodiment of this invention;

DETAILED DESCRIPTION OF THE PREFERRED EMBODIMENT

An embodiment of this invention is described in detail below with reference to the drawings. Components that are substantially the same are denoted by the same reference symbol in order to avoid repetitive descriptions.

The embodiment of this invention is described with reference to FIGS. 1 to 13.

Figure 1:
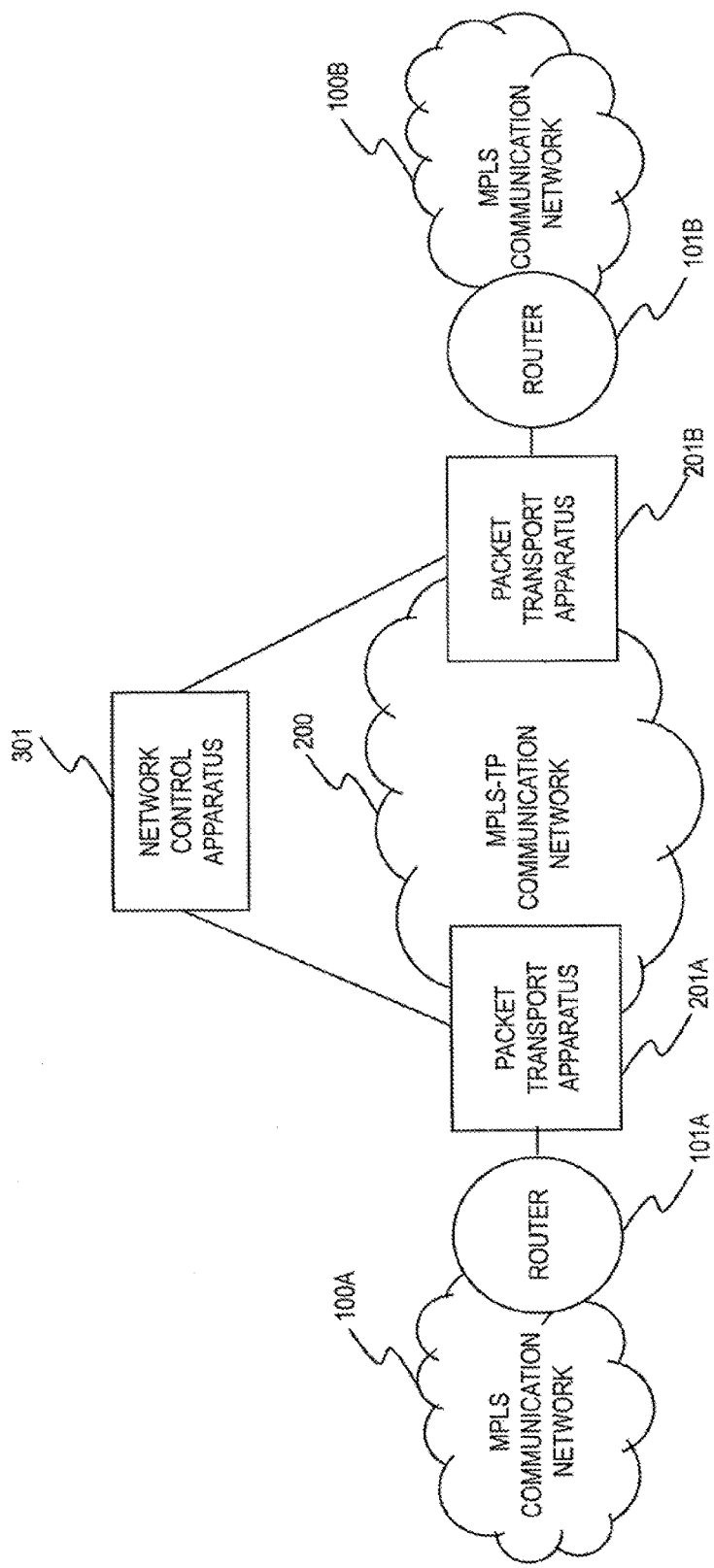
FIG. 1 is an explanatory diagram of a communication system according to an embodiment of this invention.

FIG. 1 is an explanatory diagram of a communication system according to the embodiment of this invention.

The communication system of this embodiment includes routers (transfer apparatus) 101A and 101B (hereinafter collectively referred to as routers 101), packet transport apparatus (transport apparatus) 201A and 201B (hereinafter collectively referred to as packet transport apparatus 201), and a network control apparatus 301 (control apparatus), which controls the packet transport apparatus 201. The routers 101 are used to construct MPLS communication networks (transfer networks) 100A and 100B (hereinafter collectively referred to as MPLS communication networks 100), which use MPLS (IP/MPLS). The packet transport apparatus 201 are used to construct an MPLS-TP communication network (transport network) 200 using MPLS-TP.

In the MPLS communication networks 100, the plurality of routers 101 establish paths in an autonomous distributed manner. In the MPLS-TP communication network 200, the network control apparatus 301 establishes paths. The network control apparatus 301 maps a path of the MPLS communication networks 100 and a path of the MPLS-TP communication network 200, and sets the result of the mapping in the packet transport apparatus 201 located along the path of the MPLS-TP communication network 200. Data is thus transmitted/received between a user site (not shown) that is coupled to the MPLS communication network 100A and a user site (not shown) that is coupled to the MPLS communication network 100B, which is coupled to the MPLS communication network 100A via the MPLS-TP communication network 200.

The MPLS communication networks 100 are given in this embodiment as an example of a network in which paths are established in an autonomous distributed manner. However, this invention is not limited thereto and can use any network using a communication protocol different from the protocol of the MPLS-TP communication network 200. As a network in which paths are established in an autonomous distributed manner, the network only needs to communicate data based on Layer 2 or Layer 3 address information. This network can be, for example, a network that uses MAC address, IP address, or MPLS label to communicate data.

The routers 101A and 101B and the packet transport apparatus 201A and 201B illustrated in FIG. 1 are positioned at the boundaries between the MPLS communication networks 100 and the MPLS-TP communication network 200. The router 101A and the packet transport apparatus 201A are connected to each other. The router 101B and the packet transport apparatus 201B are connected to each other.

The network control apparatus 301 is coupled to the packet transport apparatus 201 via a network (not shown).

The routers 101 transmit control messages which are conforming to an IP protocol to the packet transport apparatus 201. Control messages in this embodiment include a retainment control message for retaining a path that has been established in the MPLS communication networks 100 instead of switching the path, a switching control message for switching a path that has been established in the MPLS communication networks 100, and others. The switching control message is transmitted from the routers 101 also when a new path is to be set in the MPLS communication networks 100. The routers 101 may transmit other control messages than these to the packet transport apparatus 201.

The packet transport apparatus 201 receive a control message transmitted from the routers 101, and transmit the received control message to the network control apparatus 301.

When the received control message is a switching control message, the network control apparatus 301 establishes a path for the MPLS-TP communication network 200 in association with a switched-to path of the MPLS communication networks 100, and transmits, to the packet transport apparatus 201, path control data for setting, in the packet transport apparatus 201, mapping of the switched-to path of the MPLS communication networks 100 and the established path of the MPLS-TP communication network 200. The network control apparatus 301 also transmits to the packet transport apparatus 201 a response message that is a response to the switching control message and that contains information indicating whether its own state is normal or not normal.

When the received control message is a retainment control message, the network control apparatus 301 transmits a control message that includes information indicating whether its own state is normal or not normal to the routers 101 via the packet transport apparatus 201 in response to the retainment control message.

The network control apparatus 301 includes a processor and a storage area (not shown).

Figure 2:
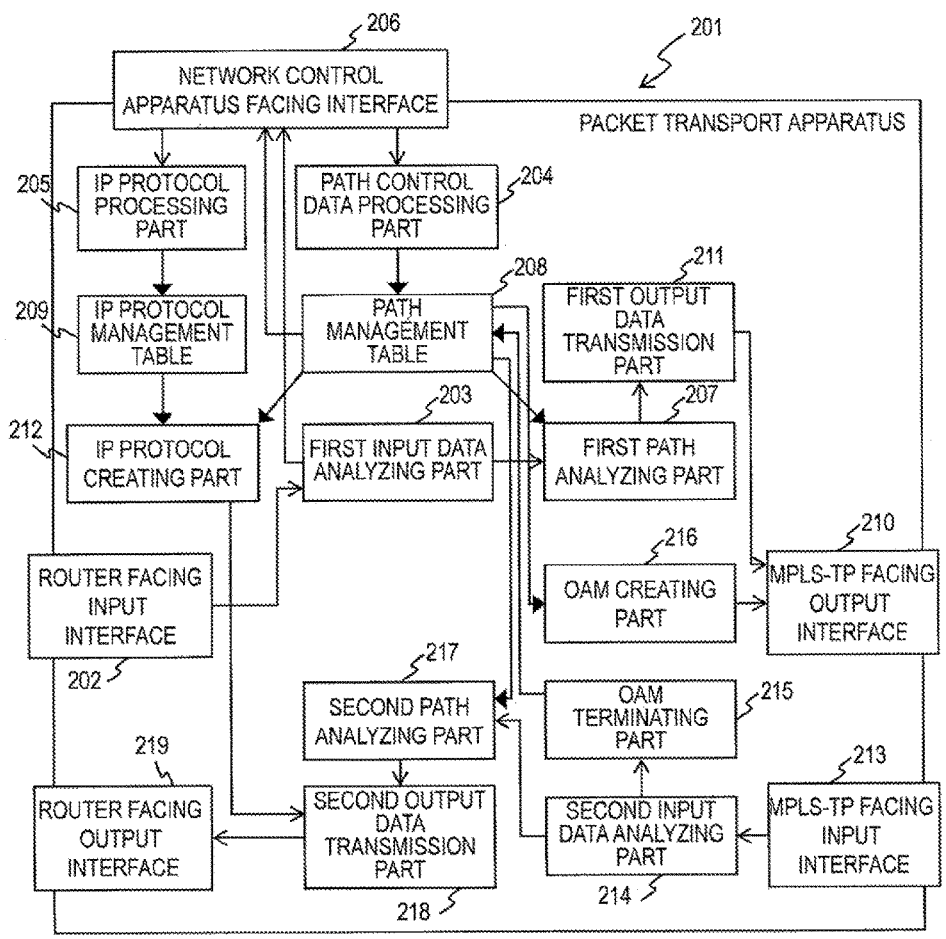
FIG. 2 is an explanatory diagram of a configuration of a packet transport apparatus according to the embodiment of this invention.

FIG. 2 is an explanatory diagram of the configuration of each packet transport apparatus 201 according to the embodiment of this invention.

The packet transport apparatus 201 includes a router facing input interface 202, a first input data analyzing part 203, a path control data processing part 204, an IP protocol processing part 205, a network control apparatus facing interface 206, a first path analyzing part 207, a path management table 208, an IP protocol management table 209, an MPLS-TP facing output interface 210, a first output data transmission part 211, an IP protocol creating part 212, an MPLS-TP facing input interface 213, a second input data analyzing part 214, an Operation, Administration, and Maintenance (OAM) terminating part 215, an OAM creating part 216, a second path analyzing part 217, a second output data t transmission part 218, and a router facing output interface 219.

The flow of data received by the router facing input interface 202 is described first.

The router facing input interface 202 is an interface that is coupled to one of the MPLS communication networks 100 to receive frames from the MPLS communication network 100.

The router facing input interface 202 inputs a frame received from the MPLS communication network 100 to the first input data analyzing part 203.

The first input data analyzing part 203 determines whether the frame input from the router facing input interface 202 is an IP frame or an MPLS frame.

When the frame input from the router facing input interface 202 is determined as an IP frame, the first input data analyzing part 203 determines that the frame input from the router facing input interface 202 is an IP control message, and transmits the frame input from the router facing input interface 202 to the network control apparatus 301 via the network control apparatus facing interface 206.

When the frame input from the router facing input interface 202 is determined as an MPLS frame, the first input data analyzing part 203 determines that the frame input from the router facing input interface 202 is a user frame, and inputs the frame input from the router facing input interface 202 to the first path analyzing part 207 in order to transmit the frame to its destination via the MPLS-TP communication network 200.

The first path analyzing part 207 analyzes the MPLS frame input from the first input data analyzing part 203, refers to the path management table 208 to identify an MPLS label (output label) that is associated with an MPLS label (input label) contained in the input MPLS frame, and identifies the MPLS-TP facing output interface 210 from which the MPLS frame is to be output. In the path management table 208, an association relation of an input label and an output label to a path established in the MPLS-TP communication network 200 is registered as well as the state of the path. The path management table 208 is described in detail with reference to FIG. 4.

The first path analyzing part 207 inputs to the first output data transmission part 211 the MPLS frame for which frame processing for attaching the identified output label to the frame has been executed.

The first output data transmission part 211 transmits the input MPLS frame to the MPLS-TP communication network 200 via the MPLS-TP facing output interface 210 identified by the first path analyzing part 207.

The flow of data received by the network control apparatus facing interface 206 is described next.

The network control apparatus facing interface 206 is an interface that receives control data transmitted from the network control apparatus 301 and transmits control data to the network control apparatus 301.

The network control apparatus facing interface 206 receives control data transmitted from the network control apparatus 301 and determines whether the received control data is an IP control message or a path control message for controlling a path of the MPLS-TP communication network 200. When the received control data is determined as an IP control message, the network control apparatus facing interface 206 inputs the received control data to the IP protocol processing part 205.

The IP protocol processing part 205 analyzes the input control data, registers the result of the analysis in the IP protocol management table 209, and inputs the input control data to the IP protocol creating part 212. Specifically, the IP protocol processing part 205 refers to information indicating whether the state of the network control apparatus 301 is normal or not normal which is contained in the IP control message transmitted by the network control apparatus 301, and registers the state of the network control apparatus 301 in the IP protocol management table 209. The IP protocol management table 209 is described in detail with reference to FIG. 5. An IP control message transmitted by the network control apparatus 301 corresponds to, for example, a hello message of one of RIP, OSPF, IS-IS, BGP, LDP, and RSVP which are IP protocols for controlling the MPLS communication network 100.

The IP protocol creating part 212 refers to the IP protocol management table 209 and the path management table 208 to create an IP control message conforming to an IP protocol that matches the result of referring to these tables, and inputs the created IP control message to the second output data transmission part 218. The second output data transmission part 218 transmits the input IP control message to one of the routers 101 via the router output interface 219.

When the received control data is determined as a path control message, the network control apparatus facing interface 206 inputs the received path control message to the path control data processing part 204.

The path control data processing part 204 updates the path management table 208 based on the input path control data.

The flow of data received by the MPLS-TP facing input interface 213 is described next.

The MPLS-TP facing input interface 213 is an interface that receives MPLS frames from the MPLS-TP communication network 200. The MPLS-TP facing input interface 213 inputs a received MPLS frame to the second input data analyzing part 214.

The second input data analyzing part 214 determines whether the input MPLS frame is a user frame or an OAM frame.

When the input MPLS frame is determined as a user frame, the second input data analyzing part 214 inputs the input MPLS frame to the second path analyzing part 217.

The second path analyzing part 217 analyzes the input MPLS frame, refers to the path management table 208 to identify an MPLS label (output label) that is associated with an MPLS label (input label) contained in the input MPLS frame, and identifies the router facing output interface 219 from which the MPLS frame is to be output. The second path analyzing part 217 inputs to the second output data transmission part 218 the MPLS frame for which frame processing for attaching the identified output label to the frame has been executed.

The second output data transmission part 218 transmits the input MPLS frame to one of the routers 101 via the router output interface 219 identified by the second path analyzing part 217.

When the input MPLS frame is determined as an OAM frame, the second input data analyzing part 214 inputs the input MPLS frame to the OAM terminating part 215.

The OAM terminating part 215 terminates the input MPLS frame (OAM frame), and registers the state of a path of the MPLS-TP communication network 200 that is identified by the OAM frame in the path management table 208. The OAM terminating part 215 at this point transmits a path state notification, which indicates the state of a path of the MPLS-TP communication network 200 that is identified by the OAM frame, to the network control apparatus 301 via the network control apparatus facing interface 206.

The OAM creating part 216 creates an OAM frame when a given period of time elapses since the last OAM frame transmission, and transmits the created OAM frame to the MPLS-TP communication network 200 via the MPLS-TP facing output interface 210.

Figures 3, 4:
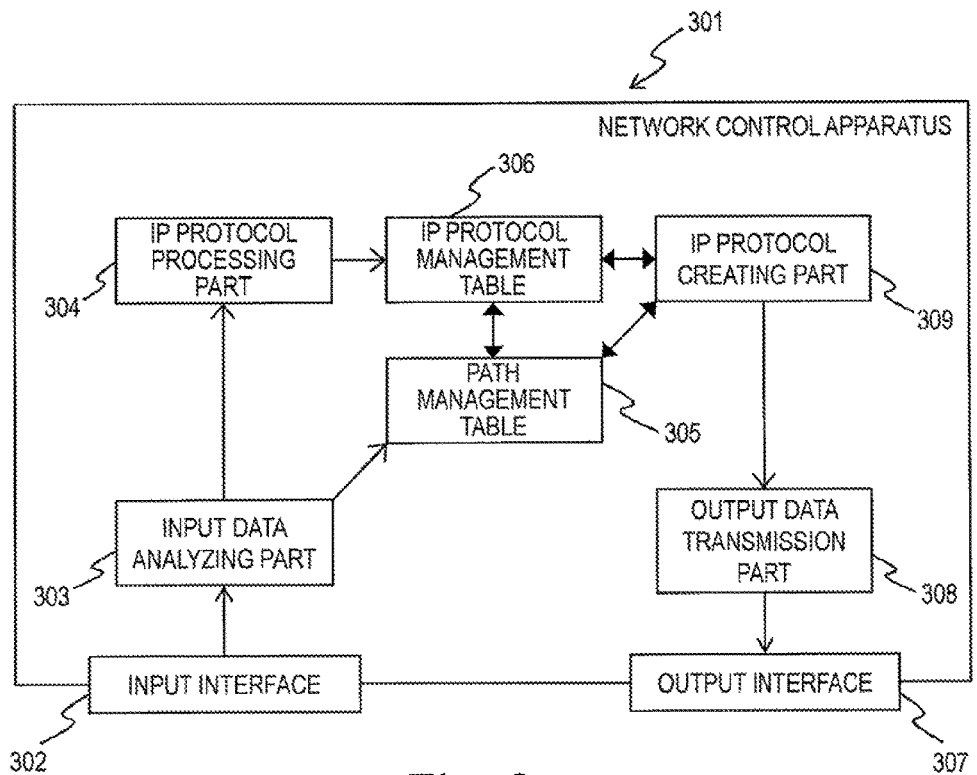
FIG. 3 is an explanatory diagram of a configuration of a network control apparatus according to the embodiment of this invention.
FIG. 4 is an explanatory diagram of a path management table which is kept by the packet transport apparatus according to the embodiment of this invention.

FIG. 3 is an explanatory diagram of the configuration of the network control apparatus 301 according to the embodiment of this invention.

The network control apparatus 301 includes an input interface 302, an input data analyzing part 303, an IP protocol processing part 304, a path management table 305, an IP protocol management table 306, an output interface 307, an output data transmission part 308, and an IP protocol creating part 309.

The input interface 302 is an interface that receives control data from the packet transport apparatus 201. The input interface 302 inputs the received control data to the input data analyzing part 303.

The input data analyzing part 303 analyzes the input control data to determine whether the input control data is an IP frame (IP control message) or a path state notification.

When the input control data is determined as an IP frame, namely, an IP control message, the input data analyzing part 303 inputs the input IP control message to the IP protocol processing part 304.

The IP protocol processing part 304 analyzes the input IP control message, registers the result of the analysis in the IP protocol management table 306, and inputs the input IP control message to the IP protocol creating part 309. Specifically, when the IP control message is a switching control message, the IP protocol processing part 304 registers information about the switched-to path of the MPLS communication network 100, information about the switched-from path of the MPLS-TP communication network 200, and the like in the IP protocol management table 306. The IP protocol management table 306 is described in detail with reference to FIG. 7.

The IP protocol creating part 309 refers to the IP protocol management table 306 and the path management table 305 to create an IP control message (control data) conforming to an IP protocol that matches the result of referring to these tables, and to create a path control message (control data). The IP protocol creating part 309 inputs the created pieces of control data to the output data transmission part 308. The output data transmission part 308 transmits the input control data to the packet transport apparatus 201 via the output interface 307.

When the input control data is determined as a path state notification, the input data analyzing part 303 registers the state of a path of the MPLS-TP communication network 200 that is indicated by the path state notification in the path management table 305. The path management table 305 is described in detail with reference to FIG. 6.

FIG. 4 is an explanatory diagram of the path management table 208 which is kept by each packet transport apparatus 201 according to the embodiment of this invention.

The path management table 208 includes in each entry an MPLS input label 401, an MPLS output label 402, an output interface 403, a corresponding path 404, and a path state 405.

The path management table 208 is a table for managing the association relation between an input label and an output label in the packet transport apparatus 201, the state of a path of the MPLS-TP communication network 200 that is associated with the input label and the output label, and others.

An input label is registered as the MPLS input label 401. An output label that is associated with the input label registered as the MPLS input label 401 is registered as the MPLS output label 402. Registered as the output interface 403 is the identifier of the MPLS-TP facing output interface 210 or the router output interface 219 that is to output an MPLS frame to which the input label is attached.

Registered as the corresponding path 404 is the identifier of a path of the MPLS-TP communication network 200 that is associated with the input label registered as the MPLS input label 401 and with the output label registered as the MPLS output label 402. Registered as the path state 405 is path state information indicating whether the path of the MPLS-TP communication network 200 that is identified by the identifier registered as the corresponding path 404 is in a normal state or not in a normal state.

The information registered as the path state 405 is updated with an OAM frame that is received by the packet transport apparatus 201 via the MPLS-TP communication network 200.

FIG. 5 is an explanatory diagram of the IP protocol management table 209 which is kept by each packet transport apparatus 201 according to the embodiment of this invention.

The IP protocol management table 209 is a table for managing information necessary to transmit, to the network control apparatus 301 or one of the routers 101, an IP control message conforming to an IP protocol that has been transmitted from one of the routers 101 or the network control apparatus 301, the state of the network control apparatus 301, and others.

The IP protocol management table 209 includes in each entry an facing router 501, a destination network 502, a netmask 503, an output interface 504, a next hop 505, a network control apparatus 506, a control apparatus state 507, a corresponding path 508, and a path state 509.

The IP address of one of the routers 101 that is connected to the packet transport apparatus 201 is registered as the facing router 501. The IP address of a network that is the destination of an IP control message is registered as the destination network 502. A netmask that has the network IP address registered as the destination network 502 is registered as the netmask 503. The identifier of the router facing output interface 219 or the network control apparatus facing interface 206 from which the IP control message is to be output is registered as the output interface 504.

The IP address of the next relay point of the IP control message is registered as the next hop 505. The identifier of the network control apparatus 301 which is the sender or destination of the IP control message is registered as the network control apparatus 506. Registered as the control apparatus state 507 is control apparatus state information indicating whether the network control apparatus 301 which is identified by the identifier registered as the network control apparatus 506 is normal or not.

Registered as the corresponding path 508 is the identifier of a path of the MPIS-TP communication network 200 that is associated with a path of the MPLS communication networks 100 where the IP control message is communicated. Path state information indicating whether the path of the MPLS-TP communication network 200 that is identified by the identifier registered as the corresponding path 508 is in a normal state or not in a normal state is registered as the path state 509.

The control apparatus state information registered as the control apparatus state 507 is updated by the packet transport apparatus 201 based on an IP control message transmitted from the network control apparatus 301.

The path state information registered as the path state 509 is updated by the packet transport apparatus 201 based on an OAM frame that is received by the packet transport apparatus 201 via the MPLS-TP communication network 200.

Figure 6:
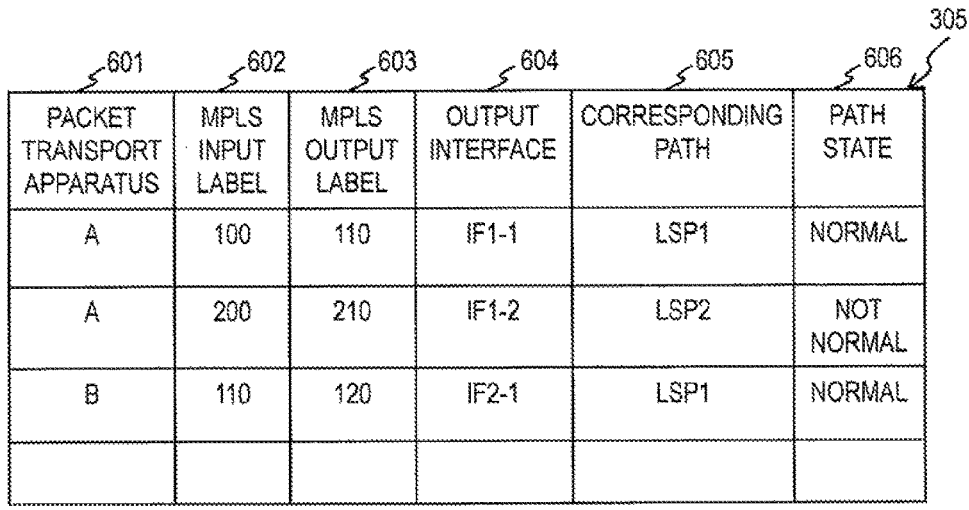
FIG. 6 is an explanatory diagram of a path management table which is kept by the network control apparatus according to the embodiment of this invention.

FIG. 6 is an explanatory diagram of the path management table 305 which is kept by the network control apparatus 301 according to the embodiment of this invention.

Information in the path management table 208 which is kept by each packet transport apparatus 201 that the network control apparatus 301 manages is registered in the path management table 305.

The path management table 305 includes in each entry a packet transport apparatus 601, an MPLS input label 602, an MPLS output label 603, an output interface 604, a corresponding path 605, and a path state 606.

Registered as the packet transport apparatus 601 is the identifier of one of the packet transport apparatus 201 managed by the network control apparatus 301. The MPLS input label 602, the MPLS output label 603, the output interface 604, the corresponding path 605, and the path state 606 are the same as the MPLS input label 401, the MPLS output label 402, the output interface 403, the corresponding path 404, and the path state 405 in the path management table 208 described with reference to FIG. 4, and descriptions thereof are omitted.

The path state information registered as the path state 606 is updated based on a path state notification that is received by the network control apparatus 301 from the packet transport apparatus 201.

Figure 7:
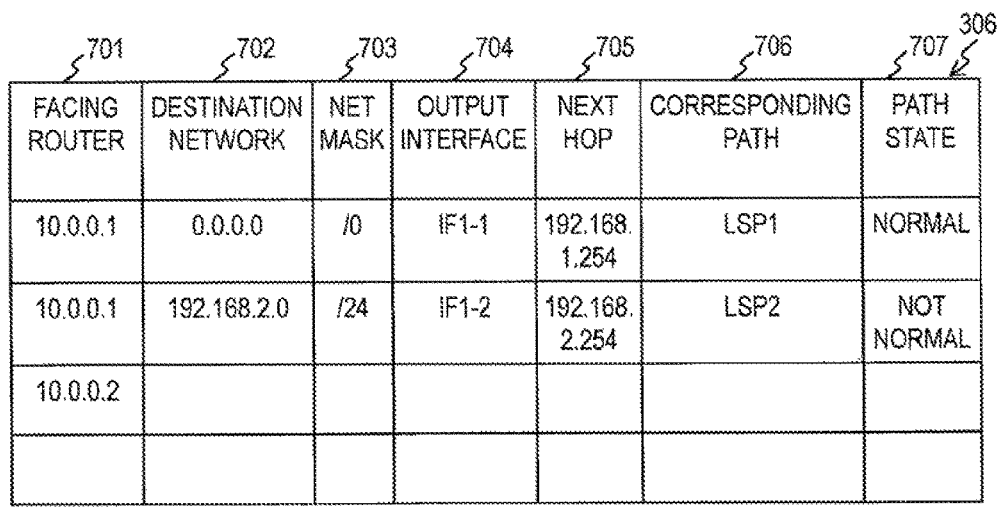
FIG. 7 is an explanatory diagram of an IP protocol management table which is kept by the network control apparatus according to the embodiment of this invention.

FIG. 7 is an explanatory diagram of the IP protocol management table 306 which is kept by the network control apparatus 301 according to the embodiment of this invention.

Information in the IP protocol management table 209 which is kept by each packet transport apparatus 201 that the network control apparatus 301 manages is registered in the IP protocol management table 306.

The IP protocol management table 306 includes in each entry an facing router 701, a destination network 702, a netmask 703, an output interface 704, a next hop 705, a corresponding path 706, and a path state 707.

The facing router 701, the destination network 702, the netmask 703, the output interface 704, the next hop 705, the corresponding path 706, and the path state 707 are the same as the facing router 501, the destination network 502, the netmask 503, the output interface 504, the next hop 505, the corresponding path 508, and the path state 509 of the IP protocol management table 209 described with reference to FIG. 5, and descriptions thereof are omitted.

The path state information registered as the path state 707 is updated based on a path state notification that is received by the network control apparatus 301 from the packet transport apparatus 201.

Figure 8:
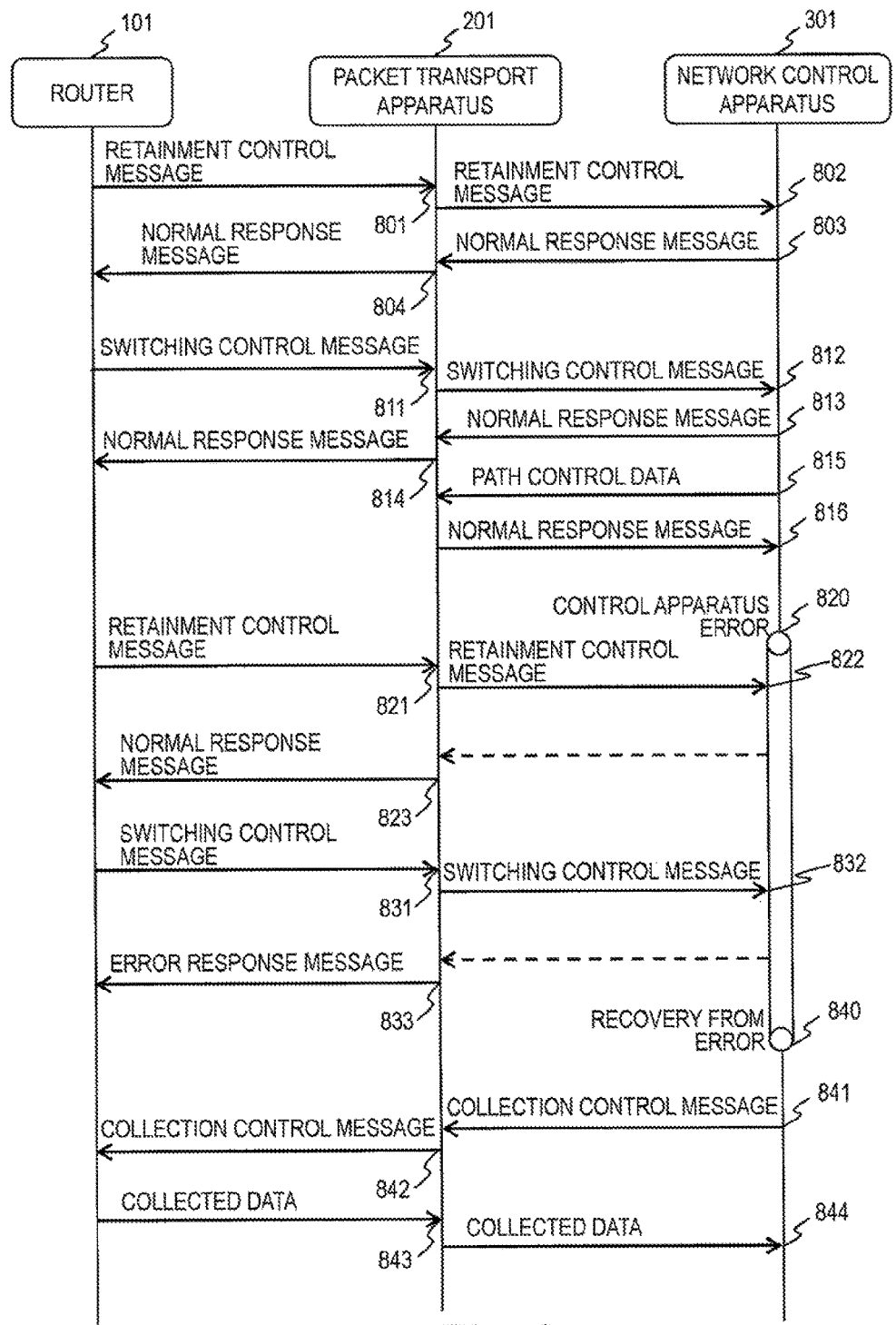
FIG. 8 is a sequence diagram illustrating how control message communicating processing is executed when there is an error in the network control apparatus according to the embodiment of this invention.

FIG. 8 is a sequence diagram illustrating how control message communicating processing is executed when there is an error in the network control apparatus 301 according to the embodiment of this invention.

How the control message communicating processing is executed when the network control apparatus 301 is in a normal state is described first.

One of the routers 101 transmits, to the relevant packet transport apparatus 201, a retainment control message for retaining a path of the MPLS communication networks 100 instead of switching the path, and the packet transport apparatus 201 receives the retainment control message transmitted from the router 101 (801). The retainment control message is data conforming to an IP protocol.

Receiving the retainment control message which has been transmitted from the router 101, the packet transport apparatus 201 transmits the received retainment control message to the network control apparatus 301, and the network control apparatus 301 receives the retainment control message transmitted from the packet transport apparatus 201 (802).

Receiving the retainment control message which has been transmitted from the packet transport apparatus 201, the network control apparatus 301 transmits a normal response message to the packet transport apparatus 201 because its own state and the state of a path of the MPLS-TP communication network 200 are both normal (803). The normal response message is data conforming to an IP protocol and is a type of control message.

A method of determining the state of a path of the MPLS-TP communication network 200 is described. A retainment control message contains the IP address of the router 101 that is the sender and an MPLS label. The network control apparatus 301 identifies, out of records of the IP protocol management table 306, a record in which a router IP address registered as the facing router 701 matches the IP address of the router 101 that is the sender, and the corresponding path 706 matches the MPLS label and the corresponding path 605 of the path management table 305.

The network control apparatus 301 determines whether path state information registered as the path state 707 of the identified record indicates "normal" or "not normal", thereby determining the state of the path of the MPLS-TP communication network 200.

Receiving the normal response message which has been transmitted from the network control apparatus 301, the packet transport apparatus 201 transmits the received normal response message to the router 101 (804).

In order to switch a path of the MPLS communication networks 100, one of the routers 101 transmits a switching control message to the relevant packet transport apparatus 201, and the packet transport apparatus 201 receives the switching control message transmitted from the router 101 (811). The switching control message is data conforming to an IP protocol.

Receiving the switching control message which has been transmitted from the router 101, the packet transport apparatus 201 transmits the received switching control message to the network control apparatus 301, and the network control apparatus 301 receives the switching control message transmitted from the packet transport apparatus 201 (812).

Receiving the switching control message which has been transmitted from the packet transport apparatus 201, the network control apparatus 301 transmits a normal response message to the packet transport apparatus 201 because its own state and the state of a path of the MPLS-TP communication network 200 are both normal (813).

Receiving the normal response message which has been transmitted from the network control apparatus 301, the packet transport apparatus 201 transmits the received normal response message to the router 101 (814).

As mentioned above, the network control apparatus 301 executes processing of setting a path for the MPLS-TP communication network 200 based on the received switching control message. Specifically, the network control apparatus 301 establishes a path for the MPLS-TP communication network 200 that is associated with a switched-to path of the MPLS communication networks 100 which is indicated by the received switching control message. The network control apparatus 301 updates the path management table 305 and the IP protocol management table 306 based on the switched-to path of the MPLS communication networks 100 and the established path of the MPLS-TP communication network 200.

The network control apparatus 301 then sets the association relation between these paths in the packet transport apparatus 201 that constructs the established path of the MPLS-TP communication network 200, and transmits path control data for updating the path management table 208 and the IP protocol management table 209 based on the post-switching path management table 305 and IP protocol management table 306 to the packet transport apparatus 201 (815).

Receiving the path control data which has been transmitted from the network control apparatus 301, the packet transport apparatus 201 sets the path association relation based on the received path control data, updates the path management table 208 and the IP protocol management table 209, and transmits a normal response message to the network control apparatus 301 (816).

How the control message communicating processing is executed when there is an error in the network control apparatus 301 is described next.

An error occurs in the network control apparatus 301 (820), causing the network control apparatus 301 to temporarily lose the ability to transmit a response message in response to a control message.

The packet transport apparatus 201 receives a retainment control message transmitted from the router 101 (821), and transmits the received retainment control message to the network control apparatus 301 (822).

The network control apparatus 301 receives the retainment control message transmitted from the packet transport apparatus 201, but cannot properly transmit a response message in response to the received retainment control message due to the error.

In the case where a given period of time elapses since the transmission of the retainment control message to the network control apparatus 301 without receiving a response message, the packet transport apparatus 201 determines that the state of the network control apparatus 301 is not normal, and updates the control apparatus state information registered as the control apparatus state 507 in the IP protocol management table 209 so as to indicate the state of the network control apparatus 301 to be "not normal". Specifically, the packet transport apparatus 201 identifies, out of records of the IP protocol management table 209, a record in which a router IP address registered as the facing router 501 matches the IP address of the router 101 that is the sender of the received retainment control message, and the corresponding path 508 matches an MPLS label and the corresponding path 404 of the path management table 208. The packet transport apparatus 201 updates the control apparatus state information registered as the control apparatus state 507 in the identified record so as to indicate "not normal".

The path state information for a path of the MPLS-TP communication network 200 that is relevant to the received retainment control message indicates "normal". The packet transport apparatus 201 therefore transmits to the router 101 a normal response message, despite the fact that there is an error in the network control apparatus 301 (823). This is because user data can be communicated via the path of the MPLS-TP communication network 200 irrespective of an error in the network control apparatus 301, and there is no need to notify the router 101 of the error in the network control apparatus 301 to stop the communication of user data. In the case where "not normal" is indicated by the path state information for the path of the MPLS-TP communication network 200 that is relevant to the received retainment control message, user data cannot be communicated and the packet transport apparatus 201 accordingly transmits an error response message to the router 101.

Described next is a case where a switching control message is transmitted from the router 101 while there is an error in the network control apparatus 301.

The packet transport apparatus 201 receives a switching control message transmitted from the router 101 (831), and transmits the received switching control message to the network control apparatus 301 (832).

The network control apparatus 301 receives the switching control message transmitted from the packet transport apparatus 201, but cannot properly transmit a response message in response to the received switching control message due to the error.

In the case where a given period of time elapses since the transmission of the switching control message to the network control apparatus 301 without receiving a response message, the packet transport apparatus 201 determines that the state of the network control apparatus 301 is not normal, and updates the IP protocol management table 209. This processing of updating the IP protocol management table 209 is the same as the above-mentioned processing of updating the IP protocol management table 209 which is executed when the packet transport apparatus 201 does not receive a response message from the network control apparatus 301 in response to a retainment control message, and a description thereof is omitted.

The packet transport apparatus 201 then transmits an error response message to the router 101 regardless of whether "normal" or "not normal" is indicated by the path state information for a path of the MPLS-TP communication network 200 that is relevant to the received switching control message (833). This is because, when there is an error in the network control apparatus 301, the network control apparatus 301 cannot switch paths of the MPLS-TP communication network 200 and it is necessary to notify the router 101 that has transmitted the switching control message of the fact that paths of the MPLS-TP communication network 200 cannot be switched.

A case where the network control apparatus 301 recovers from an error is described next.

The network control apparatus 301 detects a recovery (840) from an error, and transmits to the packet transport apparatus 201 a collection control message for collecting information about a path of the MPLS communication networks 100 from the router 101. The information about a path of the MPLS communication networks 100 is, for example, route information of a path established in the MPLS communication networks 100.

Receiving the collection control message which has been transmitted from the network control apparatus 301, the packet transport apparatus 201 transmits the received collection control message to the router 101 (842).

Receiving the collection control message which has been transmitted from the packet transport apparatus 201, the router 101 transmits, in response to the received collection control message, collected data which includes information about a path of the MPLS communication networks 100 that is kept by the router 101 (843). The collected data is data conforming to an IP protocol.

Receiving the collected data which has been transmitted from the router 101, the packet transport apparatus 201 transmits the received collected data to the network control apparatus 301 (844).

The network control apparatus 301 receives the collected data which has been transmitted from the packet transport apparatus 201, thereby collecting information about a path established in the MPLS communication networks 100. The network control apparatus 301 can thus recognize changes made while there is an error in the network control apparatus 301, such as a change in the settings of a path established in the MPLS communication networks 100.

Described above with reference to Steps 820 to 833 of FIG. 8 is a case in which an error in the network control apparatus 301 prevents the transmission of control messages. It is also a possibility that an error occurs in the network control apparatus 301 that does not cause the network control apparatus 301 to lose the ability to transmit a control message.

A case in which the network control apparatus 301 receives a retainment control message and a switching control message while there is such an error is described.

In the case where the network control apparatus 301 receives a retainment control message transmitted from the packet transport apparatus 201, because a path of the MPLS-TP communication network 200 is in a normal state whereas there is an error in the network control apparatus 301, the network control apparatus 301 transmits an error response message to the packet transport apparatus 201. The error response message is data conforming to an IP protocol and is a type of control message.

Receiving the error response message which has been transmitted from the network control apparatus 301, the packet transport apparatus 201 updates the IP protocol management table 209 based on the received error response message so that the control apparatus state information registered as the control apparatus state 507 indicates "not normal". In the case of a retainment control message, there is no need to inform the router 101 of an error in the network control apparatus 301 as long as path state information for the path of the MPLS-TP communication network 200 indicates "normal", and the packet transport apparatus 201 therefore transmits a normal response message to the router 101.

In the case where the network control apparatus 301 receives a switching control message transmitted from the packet transport apparatus 201, because there is an error in the network control apparatus 301 although the state of the path of the MPLS-TP communication network 200 is normal, the network control apparatus 301 transmits an error response message to the packet transport apparatus 201.

Receiving the error response message which has been transmitted from the network control apparatus 301, the packet transport apparatus 201 updates the IP protocol management table 209 based on the received error response message so that the control apparatus state information registered as the control apparatus state 507 indicates "not normal". In the case of a switching control message, paths of the MPLS-TP communication network 200 cannot be switched when there is an error in the network control apparatus 301, and it is necessary to notify the router 101 of the error in the network control apparatus 301. The packet transport apparatus 201 accordingly transmits an error response message to the router 101.

How control message communicating processing is executed when there is an error in a path of the MPLS-TP communication network 200 is described next with reference to FIG. 9.

Figure 9:
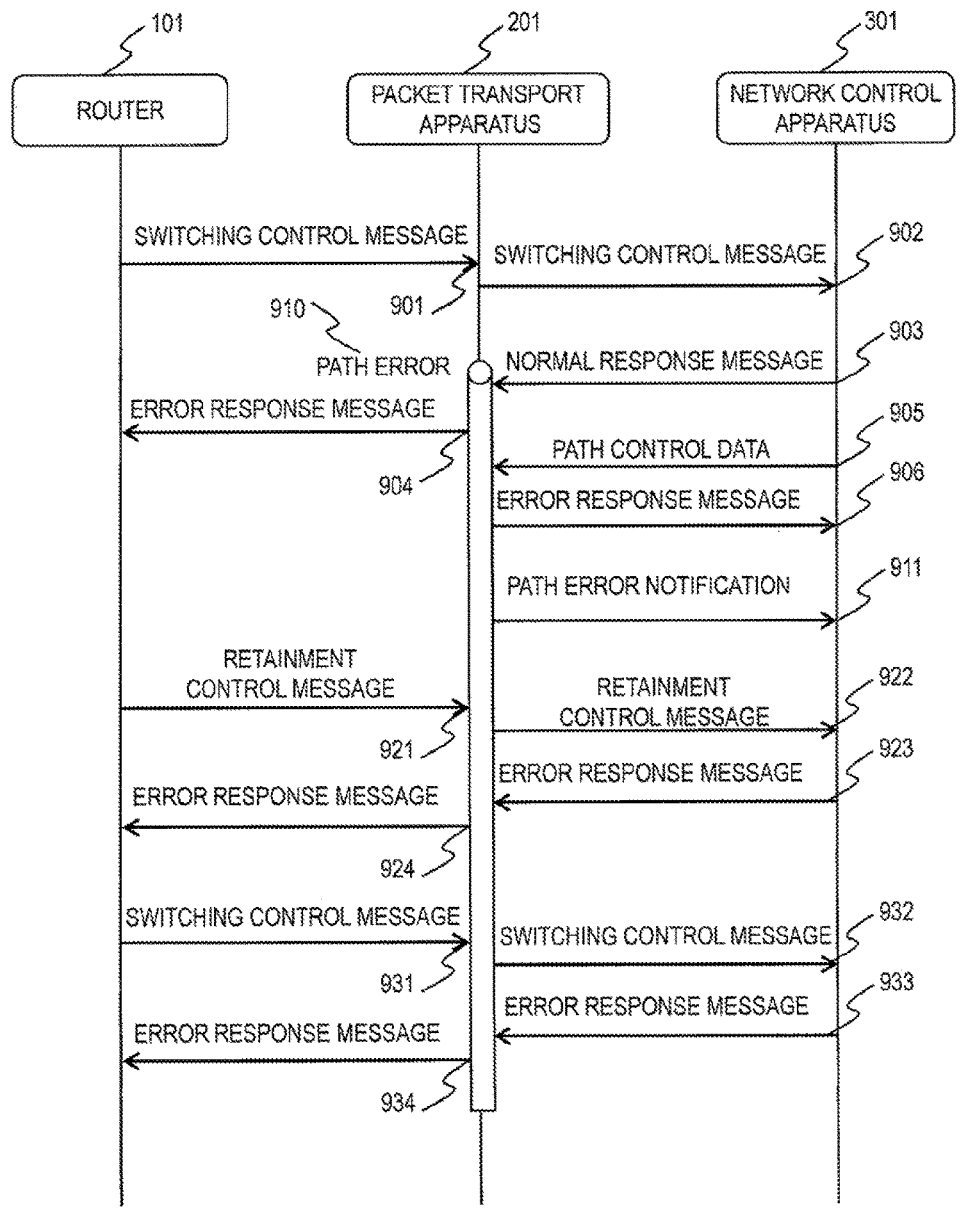
FIG. 9 is a sequence diagram illustrating how the communicating processing is executed when there is an error in a path of an MPLS-TP communication network according to the embodiment of this invention.

FIG. 9 is a sequence diagram illustrating how the communicating processing is executed when there is an error in a path of the MPLS-TP communication network 200 according to the embodiment of this invention.

Steps 901 to 903 are the same processing as Steps 811 to 813 of FIG. 8, and a description thereof is omitted.

The packet transport apparatus 201 detects an error along a path established in the MPLS-TP communication network 200 (910). The packet transport apparatus 201 detects an error along a path established in the MPLS-TP communication network 200 when an OAM frame, which is transmitted/received in given cycles between one packet transport apparatus 201 and another, has not been received for a given period of time or longer. Detecting an error along a path established in the MPLS-TP communication network 200, the packet transport apparatus 201 updates a record of the path management table 208 for the path where the error has occurred so that the path state information registered as the path state 405 in the record indicates "not normal". The packet transport apparatus 201 also updates a record of the IP protocol management table 209 for the path where the error has occurred so that the path state information registered as the path state 509 in the record indicates "not normal".

The packet transport apparatus 201 receives a normal response message transmitted from the network control apparatus 301 and, because the error in the path of the MPLS-TP communication network 200 is preventing the switching of paths, transmits an error response message to the router 101 (904).

The network control apparatus 301 transmits path control data for switching paths to the packet transport apparatus 201 (905). Receiving the path control data which has been transmitted from the network control apparatus 301, the packet transport apparatus 201 transmits an error response message to the network control apparatus 301 because the error in the path of the MPLS-TP communication network 200 is preventing the switching of paths (906).

The packet transport apparatus 201 transmits to the network control apparatus 301 a path error notification including the identifier of the path where the error has occurred, and the network control apparatus 301 receives the path error notification (911).

Based on the received path error notification, the network control apparatus 301 updates the path management table 305 and the IP protocol management table 306. Specifically, the network control apparatus 301 selects, out of records of the path management table 305, a record in which a path identifier registered as the corresponding path 605 matches the path identifier included in the received path error notification. The network control apparatus 301 updates the path management table 305 so that the path state information registered as the path state 606 in the record indicates "not normal". The IP protocol management table 306 is updated in a similar manner, and a description on the updating method is omitted.

Next, the router 101 transmits a retainment control message to the packet transport apparatus 201, and the packet transport apparatus 201 receives the retainment control message transmitted from the router 101 (921).

The packet transport apparatus 201 transmits the received retainment control message to the network control apparatus 301, and the network control apparatus 301 receives the retainment control message transmitted from the packet transport apparatus 201 (922).

The network control apparatus 301 then refers to the path management table 305 and the IP protocol management table 306 and, because the path state information of a path that is relevant to the received retainment control message indicates "not normal" whereas the network control apparatus 301 is in a normal state, transmits an error response message to the packet transport apparatus 201 (923).

Receiving the error response message, the packet transport apparatus 201 transmits an error response message to the router 101 because the error in the path of the MPLS-TP communication network 200 is preventing the communication of user data (924). The packet transport apparatus 201 thus notifies the router 101 that has transmitted the retainment control message of the fact that user data cannot be communicated.

Next, the router 101 transmits a switching control message to the packet transport apparatus 201, and the packet transport apparatus 201 receives the switching control message transmitted from the router 101 (931).

The packet transport apparatus 201 transmits the received switching control message to the network control apparatus 301, and the network control apparatus 301 receives the switching control message transmitted from the packet transport apparatus 201 (932).

Receiving the switching control message, the network control apparatus 301 transmits an error response message to the packet transport apparatus 201 because there is an error in a path of the MPLS-TP communication network 200 whereas the network control apparatus 301 is in a normal state (933).

Receiving the error response message which has been transmitted from the network control apparatus 301, the packet transport apparatus 201 transmits the received error response message to the router 101 (934).

Communicating processing of the packet transport apparatus 201 is described next with reference to FIGS. 10 to 12.

Figure 10:
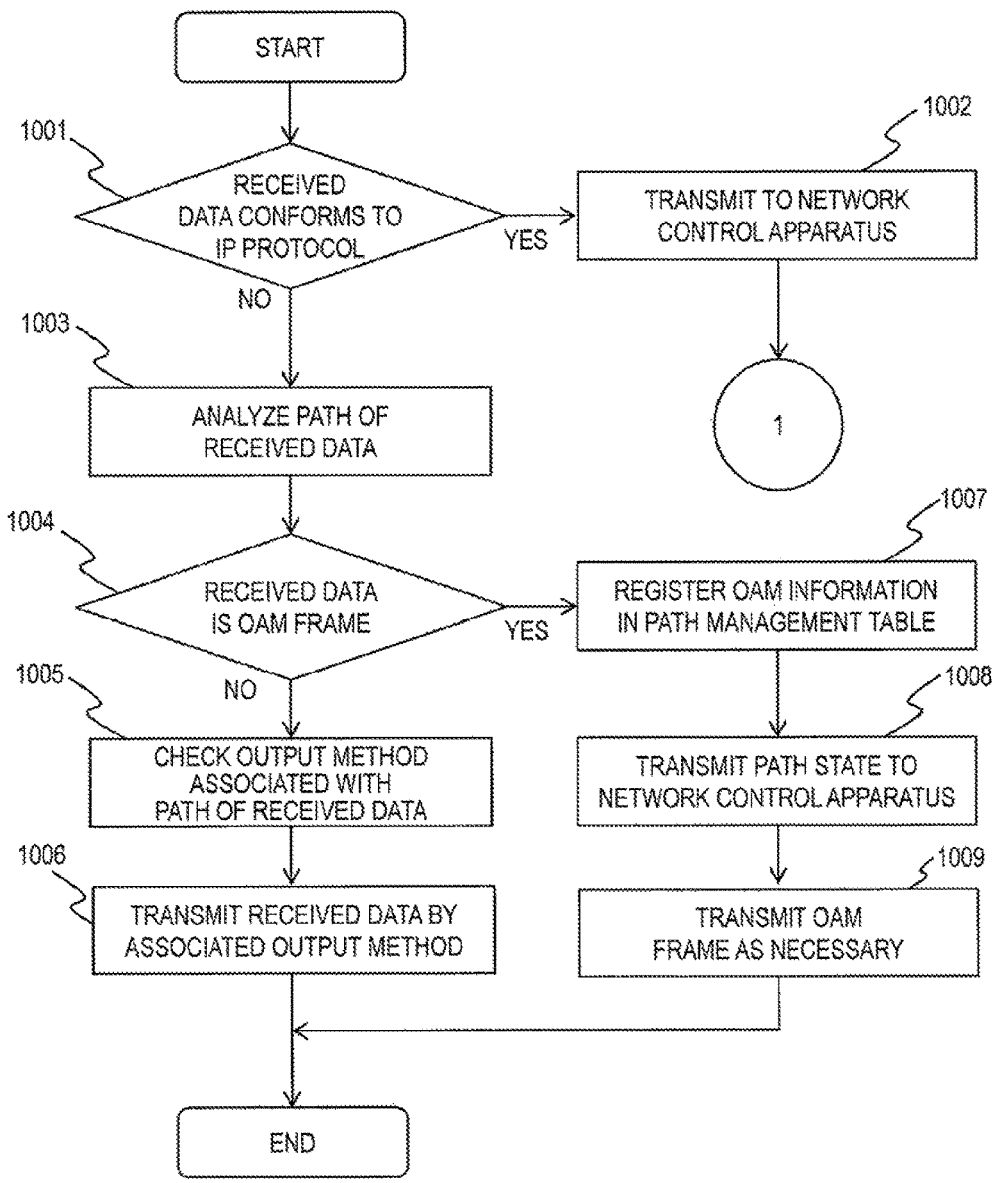
FIG. 10 is a flow chart of processing that is executed according to the embodiment of this invention in each of the packet transport apparatus when data is received from a router facing input interface or an MPLS-TP facing input interface of the each of the packet transport apparatus.

FIG. 10 is a flow chart of processing that is executed according to the embodiment of this invention in each of the packet transport apparatus 201 when data is received from the router facing input interface 202 or the MPLS-TP facing input interface 213 of the each of the packet transport apparatus 201.

The each of the packet transport apparatus 201 first determines whether or not the received data is data that conforms to an IP protocol, namely, a control message from one of the routers 101 (1001).

Figure 11:
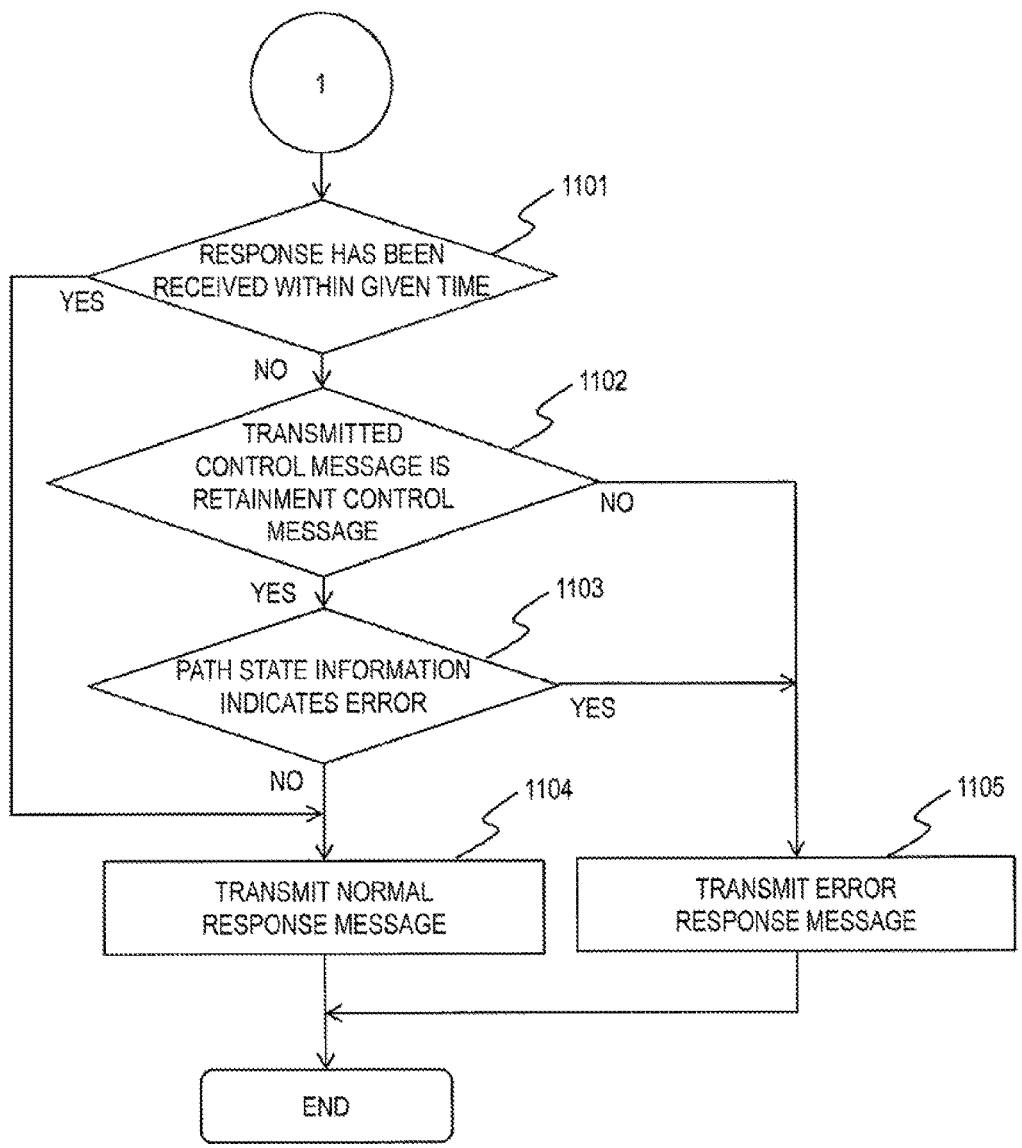
FIG. 11 is a flow chart of processing that is executed according to the embodiment of this invention after a control message received by the each of the packet transport apparatus is transmitted to the network control apparatus.

When it is determined in Step 1001 that the received data is data that conforms to an IP protocol, in other words, when the received data is a control message, the each of the packet transport apparatus 201 transmits the received control message via the network control apparatus facing interface 206 (1002), and shifts the processing onto Step 1101 of FIG. 11. Details of Step 1101 are described with reference to FIG. 11.

When it is determined in Step 1001 that the received data is not data that conforms to an IP protocol, on the other hand, the received data is an MPLS frame to which an MPLS header is attached, and the each of the packet transport apparatus 201 analyzes the received data (1003).

The each of the packet transport apparatus 201 determines whether the received data is an OAM frame or not (1004). When it is determined in Step 1004 that the received data is not an OAM frame, the received data is user data, and the each of the packet transport apparatus 201 refers to the path management table 208 to check an output method used for the received data (1005). The output method is written in the form of, for example, an output label to be attached to the data, an output interface from which the data is to be output, and the like.

The each of the packet transport apparatus 201 transmits the received data to one of the routers 101 or another packet transport apparatus 201 from an output interface by the output method checked in Step 1005 (1006), and ends the processing.

When it is determined in Step 1004 that the received data is an OAM frame, on the other hand, the each of the packet transport apparatus 201 updates the path state information registered as the path state 405 of the path management table 208 and the path state 509 of the IP protocol management table 209 based on the received OAM frame (1007).

When the path state information registered as the path state 405 and the path state 509 is changed to "not normal" or "normal", the each of the packet transport apparatus 201 transmits a path state notification to the network control apparatus 301 from the network control apparatus facing interface 206 (1008). If necessary, the each of the packet transport apparatus 201 transmits the received OAM frame to another packet transport apparatus 201 from an output interface as information in the OAM frame dictates (1009), and ends the processing.

FIG. 11 is a flow chart of processing that is executed according to the embodiment of this invention after a control message received by the each of the packet transport apparatus 201 is transmitted to the network control apparatus 301.

After transmitting the control message to the network control apparatus 301 in Step 1002, the each of the packet transport apparatus 201 determines whether or not a response message has been received in response to the transmitted control message within a given period of time since the transmission of the control message (1101).

When it is determined in Step 1101 that a response message has been received in response to the transmitted control message within a given period of time since the transmission of the control message, the each of the packet transport apparatus 201 transmits a normal response message to the router 101 that has transmitted the control message (1104), and ends the processing.

When it is determined in Step 1101 that a response message has not been received in response to the transmitted control message within a given period of time since the transmission of the control message, on the other hand, the each of the packet transport apparatus 201 determines whether or not the control message transmitted in Step 1002 is a retainment control message (1102).

When it is determined in Step 1102 that the control message transmitted in Step 1002 is a retainment control message, the each of the packet transport apparatus 201 refers to the path state information registered as the path state 405 of the path management table 208 and the path state 509 of the IP protocol management table 209 to determine whether or not there is an error in a path of the MPLS-TP communication network 200 that is relevant to the retainment control message (1103).

When it is determined in Step 1103 that there is no error in the path of the MPLS-TP communication network 200 that is relevant to the retainment control message, user data can be communicated despite an error in the network control apparatus 301. The each of the packet transport apparatus 201 therefore transmits a normal response message to the router 101 that has transmitted the retainment control message (1104), and ends the processing.

When it is determined in Step 1103 that there is an error in the path of the MPLS-TP communication network 200 that is relevant to the retainment control message, on the other hand, user data cannot be communicated. The each of the packet transport apparatus 201 therefore transmits an error response message to the router 101 that has transmitted the retainment control message (1105), and ends the processing.

When it is determined in Step 1102 that the control message transmitted in Step 1002 is not a retainment control message, in other words, when the transmitted control message is determined as a switching control message in Step 1102, because the error in the network control apparatus 301 is preventing the switching of paths for the MPLS-TP communication network 200, the each of the packet transport apparatus 201 moves the processing on to Step 1105, where an error response message is transmitted to the router 101 that has transmitted the switching control message. The each of the packet transport apparatus 201 then ends the processing.

The each of the packet transport apparatus 201 can thus transmit an appropriate response message to the relevant router 101 in response to a control message received from the router 101, even when the each of the packet transport apparatus 201 does not receive a response message from the network control apparatus 301 after transmitting a retainment control message to the network control apparatus 301, which means that there is an error in the network control apparatus 301 and that control messages cannot be transmitted to the network control apparatus 301.

Figure 12:
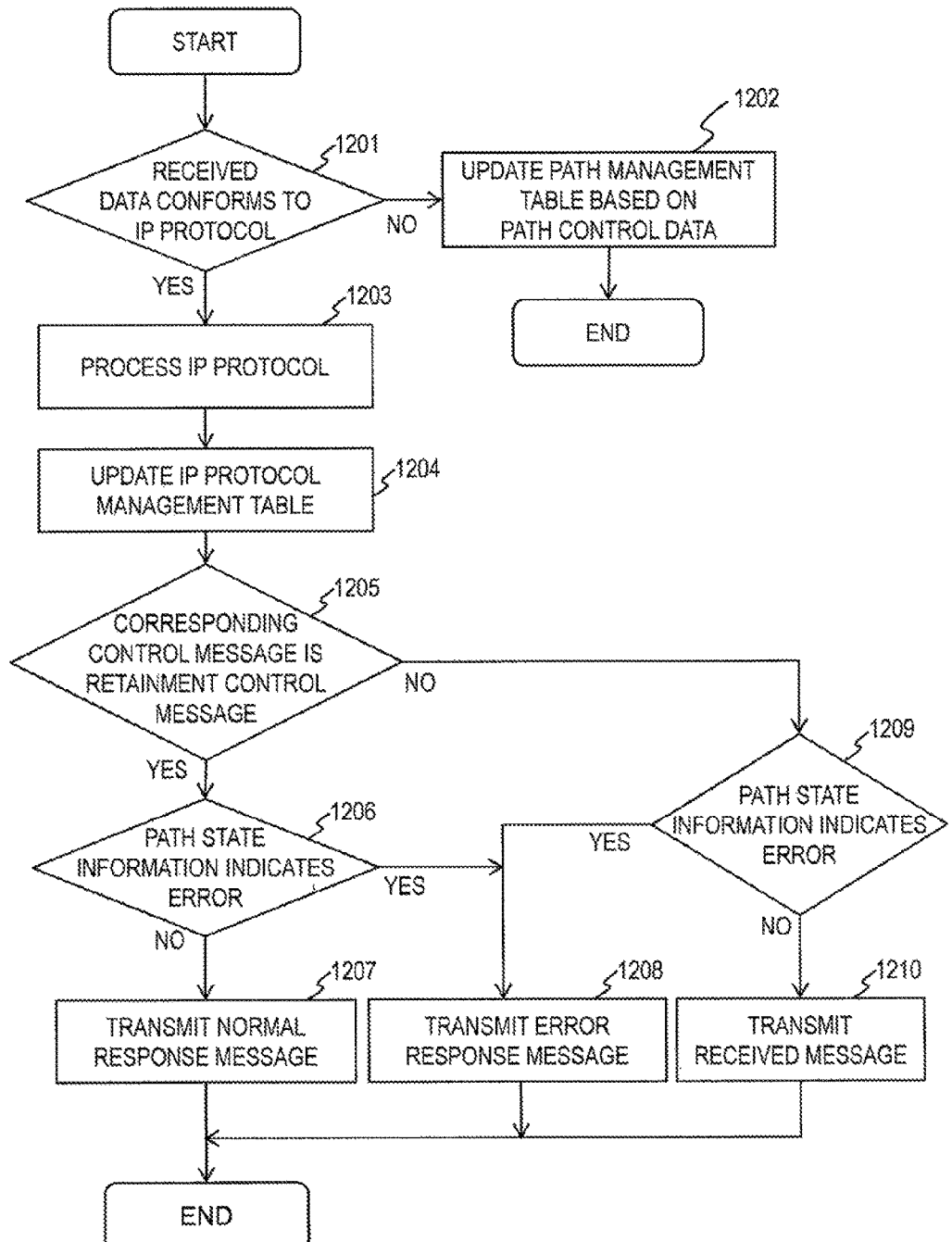
FIG. 12 is a flow chart of processing that is executed according to the embodiment of this invention in each of the packet transport apparatus when data is received from a network control apparatus facing interface of the each of the packet transport apparatus; and, FIG. 13 is a flow chart of processing that is executed according to the embodiment of this invention in the network control apparatus when data is received from the input interface of the network control apparatus.

FIG. 12 is a flow chart of processing that is executed according to the embodiment of this invention in each of the packet transport apparatus 201 when data is received from the network control apparatus facing interface 206 of the each of the packet transport apparatus 201.

The each of the packet transport apparatus 201 first determines whether or not the data received by the network control apparatus facing interface 206 is data that conforms to an IP protocol (1201).

When it is determined in Step 1201 that the data received by the network control apparatus facing interface 206 is not data that conforms to an IP protocol, the received data is path control data. The each of the packet transport apparatus 201 therefore updates the path management table 208 and the IP protocol management table 209 based on the received path control data (1202), and ends the processing.

When it is determined in Step 1201 that the data received by the network control apparatus facing interface 206 is data that conforms to an IP protocol, on the other hand, the received data is a response message transmitted from the network control apparatus 301. The each of the packet transport apparatus 201 therefore processes the IP protocol of the received response message (1203), and updates the control apparatus state information registered as the control apparatus state 507 in the IP protocol management table 209 based on the response message (1204).

The each of the packet transport apparatus 201 next determines whether or not a control message that corresponds to the received response message is a retainment control message (1205).

When it is determined in Step 1205 that the control message that corresponds to the received response message is a retainment control message, the each of the packet transport apparatus 201 refers to the path state information registered as the path state 405 of the path management table 208 and the path state 509 of the IP protocol management table 209 to determine whether or not there is an error in a path of the MPLS-TP communication network 200 that is relevant to the retainment control message (1206).

When it is determined in Step 1206 that there is no error in the path of the MPLS-TP communication network 200 that is relevant to the retainment control message, the each of the packet transport apparatus 201 transmits a normal response message to the router 101 that has transmitted the retainment control message (1207), and ends the processing.

When it is determined in Step 1206 that there is an error in the path of the MPLS-TP communication network 200 that is relevant to the retainment control message, on the other hand, the each of the packet transport apparatus 201 transmits an error response message to the router 101 that has transmitted the retainment control message (1208), and ends the processing.

When it is determined in Step 1205 that the received control message is not a retainment control message, in other words, when the received control message is determined as a switching control message, the each of the packet transport apparatus 201 refers to the path state information registered as the path state 405 of the path management table 208 and the path state 509 of the IP protocol management table 209 to determine whether or not there is an error in a path of the MPLS-TP communication network 200 that is relevant to the switching control message (1209).

When it is determined in Step 1209 that there is an error in the path of the MPLS-TP communication network 200 that is relevant to the switching control message, the each of the packet transport apparatus 201 transmits an error response message to the router 101 that has transmitted the switching control message (1208), and ends the processing.

When it is determined in Step 1209 that there is no error in the path of the MPLS-TP communication network 200 that is relevant to the switching control message, on the other hand, the each of the packet transport apparatus 201 transmits the response message received from the network control apparatus 301 to the router 101 that has transmitted the switching control message (1210), and ends the processing.

Figure 13:
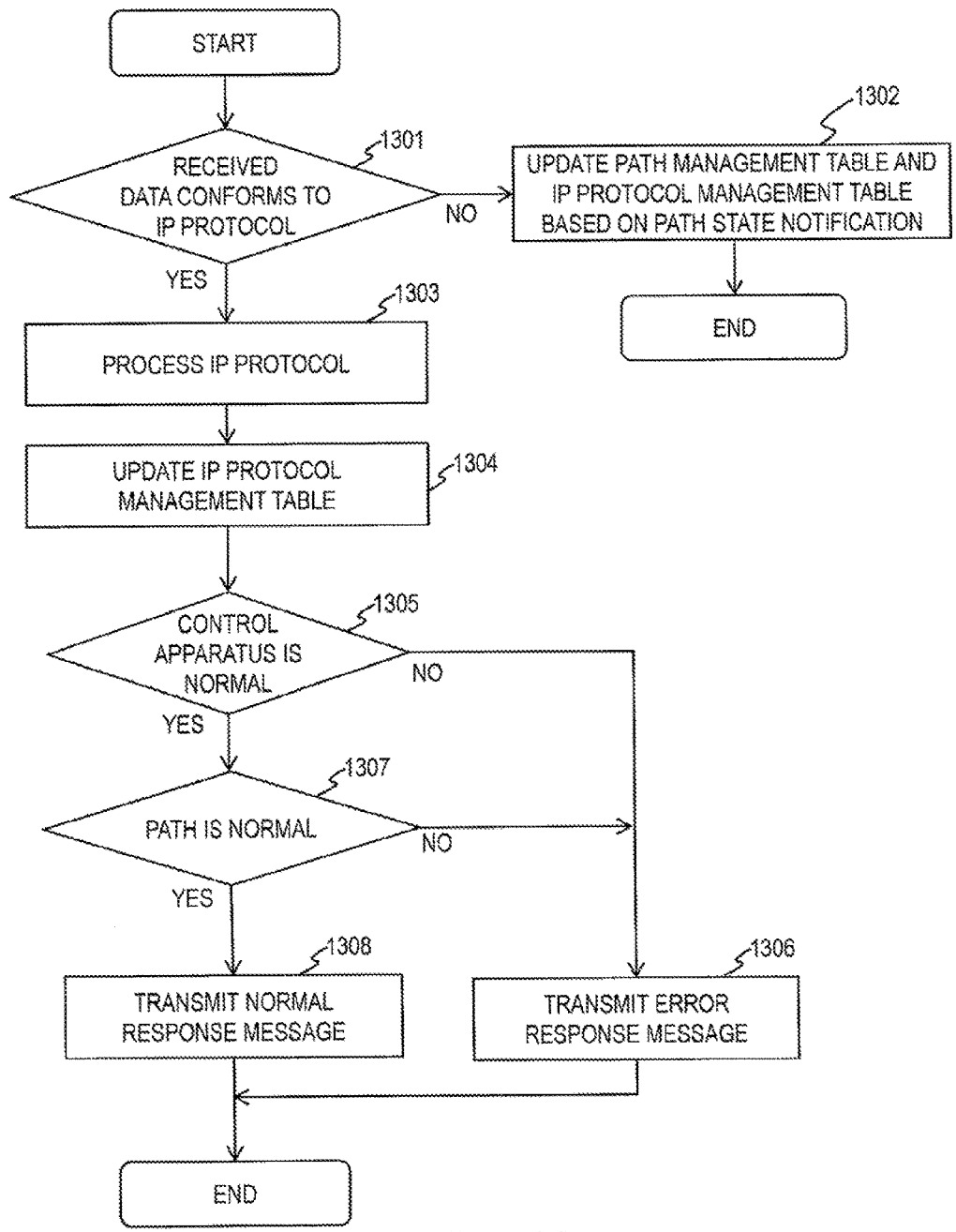

FIG. 13 is a flow chart of processing that is executed according to the embodiment of this invention in the network control apparatus 301 when data is received from the input interface 302 of the network control apparatus 301.

The network control apparatus 301 first determines whether or not the data received by the input interface 302 is data that conforms to an IP protocol (1301).

When it is determined in Step 1301 that the data received by the input interface 302 is not data that conforms to an IP protocol, the received data is a path state notification. The network control apparatus 301 therefore updates the path state information of the path management table 305 and the IP protocol management table 306 based on the received path state notification (1302), and ends the processing.

When it is determined in Step 1301 that the data received by the input interface 302 is data that conforms to an IP protocol, on the other hand, the received data is a control message transmitted from the each of the packet transport apparatus 201. The network control apparatus 301 therefore processes the IP protocol of the received control message (1303), and updates the IP protocol management table 306 based on the control message (1304).

The network control apparatus 301 next executes Steps 1305 to 1308 in order to transmit a response message.

The network control apparatus 301 first determines whether or not its own state is normal (1305). When it is determined in Step 1305 that the state of the network control apparatus 301 is not normal, the network control apparatus 301 transmits an error response message to the relevant one of the packet transport apparatus 201 (1306), and ends the processing.

When it is determined in Step 1305 that the state of the network control apparatus 301 is normal, on the other hand, the network control apparatus 301 determines whether or not the path state information indicates "normal" in a record of the path management table 305 or the IP protocol management table 306 that is relevant to the received control message (1307).

When it is determined in Step 1307 that the path state information indicates "not normal", the network control apparatus 301 moves the processing on to Step 1306, where an error response message is transmitted to the relevant one of the packet transport apparatus 201, and ends the processing.

When it is determined in Step 1307 that the path state information indicates "normal", the network control apparatus 301 transmits a normal response message to the relevant one of the packet transport apparatus 201 (1308), and ends the processing.

As has been described, a normal response message is transmitted in this embodiment in response to a retainment control message transmitted from one of the routers 101 despite an error in the network control apparatus 301, as long as a path of the MPLS-TP communication network 200 is normal. This ensures that, in a system where a path is built through cooperation between an IP layer protocol which uses traditional MPLS (IP/MPLS) to establish a path in a communication network and a network control apparatus which uses MPLS-TP to establish a path, an IP/MPLS communication network is not notified of an error that the IP/MPLS communication network does not need to be notified of. A highly reliable communication system in which communication network control processing is separated from processing of data transmission along a path is provided as a result.

This invention is not limited to the embodiment described above, and includes various modification examples. For instance, the embodiment given above is a detailed description that is written for easy understanding of this invention, and this invention is not necessarily limited to a mode that includes all the components described. Replacing some components of one embodiment with components of another embodiment is also an option. Components of one embodiment may be added with components of another embodiment. For some components in each embodiment, other components may be added or deleted or may substitute.

Some of or all of the components, functions, processing parts, processing measures, and the like described above may be implemented by hardware by, for example, designing those in the form of an integrated circuit. Alternatively, the components, functions, and the like described above may be implemented by software by having a processor interpret and execute programs that respectively implement the described functions. Programs, tables, files, and other types of information for implementing the described functions can be put in a memory, a recording device such as a hard disk or a solid state drive (SSD), or a recording medium such as an IC card, an SD card, or a DVD.

What is claimed is:

1. A transport system, comprising:
a plurality of packet transport apparatus, wherein each individual packet transport apparatus is communicatively coupled to the plurality of packet transport apparatus by a first network that uses a Multiprotocol Label Switching-Transport Profile (MPLS-TP);
a plurality of routers, wherein each individual packet transport apparatus is communicatively coupled to and associated with a particular router from the plurality of routers, and
a network control apparatus communicatively coupled to each individual transfer apparatus by the first network, wherein each individual router is communicatively coupled to a second network that uses a network protocol different from an MPLS-TP protocol;
wherein each individual packet transport apparatus is configured to:
receive a control message from a device via the second network,
transmit the control message to the network control apparatus,
determine an operational state of the network control apparatus based on a response message received from the network control apparatus;
determine an operational state of a path, wherein the path forms a communicative connection between the individual packet transport apparatus and another packet transport apparatus via the first network;
transmit a message to the router associated with the individual packet transport apparatus when the determined operational state of the network controller is in an error state and the determined operational state of the path is in an error state; and
not transmit a message to the router associated with the individual packet transport apparatus when the determined operational state of the network controller and the determined operational state of the path is not in an error state.

2. The transport system according to claim 1,
wherein each individual packet transport apparatus is further configured to:
in a case where the response message is not received from the network control apparatus within a given period from the transmission of the control message to the network control apparatus, determine that the operational state of the network control apparatus is in the error state.

3. The transport system according to claim 2,
wherein the control message includes either a retainment control message for retaining the path that has been established in the first network instead of switching the path or a switching control message for switching the path that has been established in the first network, and
wherein each individual packet transport apparatus is further configured to:
determine whether the received control message is the retainment control message or the switching control message;
in a case where the received control message is determined as the retainment control message, the operational state of the network control apparatus is is in the error state, and the path is in a non-error state, transmit a message to the router associated with the individual packet transport apparatus that does not include information indicating that the operational state of the network control apparatus is in the error state; and
in a case where the received control message is determined as the switching control message and the operational state of the network control apparatus is in the error state, transmit a message to the router associated with the individual packet transport apparatus that includes information indicating that the operational state of the network control apparatus is the error state and the path is unswitchable.

4. The transport system according to claim 1,
wherein, in a case where the operational state of the network control apparatus changes from the error state to a non-error state, the network control apparatus transmits a collection control message for collecting information about the path to the plurality of transport apparatus, and
wherein each individual packet transport apparatus is further configured to:
in a case where the collection control message is received, the transport apparatus transmits the received collection control message to the router associated with the individual packet transport apparatus.

5. The transport system according to claim 1, wherein each individual packet transport apparatus determines whether the path is in a non-error state or in the error state by using OAM data which is transmitted/received in the MPLS-TP protocol.

6. The transport system according to claim 1,
wherein the network protocol used in the first network comprises an IP/MPLS protocol, and
wherein each individual packet transport apparatus determines the operational state of the network control apparatus by receiving from the network control apparatus a hello message of one of Routing Information Protocol (RIP), Open Shortest Path First (OSPF), Intermediate System to Intermediate System (IS-IS), Border Gateway Protocol (BGP), Label Distribution Protocol (LDP), or Resource Reservation Protocol (RSVP) which are internet protocols (IP) for controlling the first network.

7. A packet transport apparatus comprising:
a first communication interface, wherein the first communication interface is communicatively coupled to a plurality of other packet transport apparatus by a first network that uses a Multiprotocol Label Switching-Transport Profile (MPLS-TP)
a second communication interface, wherein the second communication interface is communicatively coupled to a second network that uses a network protocol different from an MPLS-TP protocol by a particular router from a plurality of routers; and
a processor communicatively coupled to the first communication interface and the second communication interface;
wherein the processor:
receives a control message from a device via the second network,
transmits the control message to a control apparatus,
determines an operational state of the network control apparatus based on a response message received from the network control apparatus;
determines an operational state of a path, wherein the path forms a communicative connection between individual packet transport apparatus in the first network,
transmits a message to the particular router when the determined operational state of the network control apparatus is in an error state and the determined operational state of the path is in the error state; and
does not transmits a message to the particular router when the determined operational state of the network control apparatus and the determined operational state of the path is not in the error state.

8. The packet transport apparatus according to claim 7,
wherein the processor further:
in a case where the response message is not received from the network control apparatus within a given period from the transmission of the control message to the network control apparatus determines operational state of the network control apparatus is the error state.

9. The transport apparatus according to claim 8,
wherein the control message includes either a retainment control message for retaining the path that has been established in the first network instead of switching the path or a switching control message for switching the path that has been established in the first network, and
wherein the processor further:
determines whether the received control message is the retainment control message or the switching control message;
in a case where the received control message is determined as the retainment control message, the operational state of the network control apparatus is the error state, and the path is in a non-error state, transmits to the particular router a message that does not include information indicating the operational state of the network control apparatus is the error state; and
in a case where the received control message is determined as the switching control message and the operational state of the network control apparatus is in the error state, transmit a message that includes information indicating the operational state of the network control apparatus is in the error state and the path is unswitchable.

10. The transport apparatus according to claim 7, wherein, when the operational state of the network control apparatus changes from the error state to a non-error state, the network control apparatus transmits a collection control message for collecting information about the path, and wherein, in a case where the collection control message is received, the transport apparatus transmits the received collection control message to the plurality of transfer apparatus in the first network.

11. The transport apparatus according to claim 7, wherein the transport apparatus determines whether the path is in a non-error state or in the error state by using OAM data which is transmitted/received in the MPLS-TP protocol in order to manage the state of the path.

12. The transport apparatus according to claim 7, wherein the network protocol used in the first network comprises an IP/MPLS protocol, and wherein the transport apparatus determines the operational state of the network control apparatus by receiving from the network control apparatus a hello message of one of Routing Information Protocol (RIP), Open Shortest Path First (OSPF), Intermediate System to Intermediate System (IS-IS), Border Gateway Protocol (BGP), Label Distribution Protocol (LDP), or Resource Reservation Protocol (RSVP) which are internet protocols (IP) for controlling the first network.

13. A packet transport method for transmitting control messages through a transport apparatus, the transport method comprising:

communicating, by a particular packet transport apparatus, with one or more of a plurality of packet transport apparatus via a first network that uses a Multiprotocol Label Switching-Transport Profile (MPLS-TP);

receiving, by the particular packet transport apparatus, a control message from a router via a second network, wherein the second network uses a network protocol different from an MPLS-TP protocol;

transmitting, by the particular packet transport apparatus, the control message to a control apparatus;

determining, by the particular transport apparatus, an operational state of the network control apparatus based on a response message received from the network control apparatus;

determining, by the particular transport apparatus, an operational state of a path, wherein the path forms a communicative connection between the particular packet transport apparatus and another packet transport apparatus via the first network;

transmitting, by the particular transport apparatus, a message to the router when the determined operational state of the network control apparatus is in an error state and the determined operational state of the path is in the error state; and not transmitting, by the particular transport apparatus, a message to the router when the determined operational state of the network control apparatus and the determined operational state of the path is in a non-error state.

\* \* \* \* \*